United States Patent [19]

Cratty

[11] 4,103,352

[45] Jul. 25, 1978

[54] TRANSPORTER AND LOADING BOX FOR CONCRETE MIXER

[75] Inventor: Charles J. Cratty, Seattle, Wash.

[73] Assignee: Astro Development Corporation, Seattle, Wash.

[21] Appl. No.: 700,463

[22] Filed: Jun. 28, 1976

[51] Int. Cl.[2] .................................... B23C 7/08

[52] U.S. Cl. .................................... 366/39; 366/150

[58] Field of Search ............... 259/167, 164, 168, 166, 259/160; 222/166, 164

[56] References Cited

U.S. PATENT DOCUMENTS

| | | | |
|---|---|---|---|
| 1,664,427 | 4/1928 | McCree | 259/166 |
| 1,729,602 | 10/1929 | Allen | 259/166 |
| 3,218,045 | 11/1965 | Cox | 259/167 |
| 3,257,032 | 6/1966 | Stout | 259/160 X |
| 3,767,171 | 10/1973 | Dunmire | 259/164 X |

*Primary Examiner*—Billy S. Taylor

*Attorney, Agent, or Firm*—Seed, Berry, Vernon & Baynham

[57] ABSTRACT

A transporting trailer or transporter is provided with a mixing or batch box and a support ramp for supporting a portable mixer. The batch box is stored and carried with the transporter as it is carrying the portable mixer to a construction site. At the site the portable mixer is loaded by the batch box and then driven to the pouring site. The mixer has a power takeoff and when positioned on the transporter automatically provides power to raise and lower the batch box.

8 Claims, 10 Drawing Figures

FIG. 4
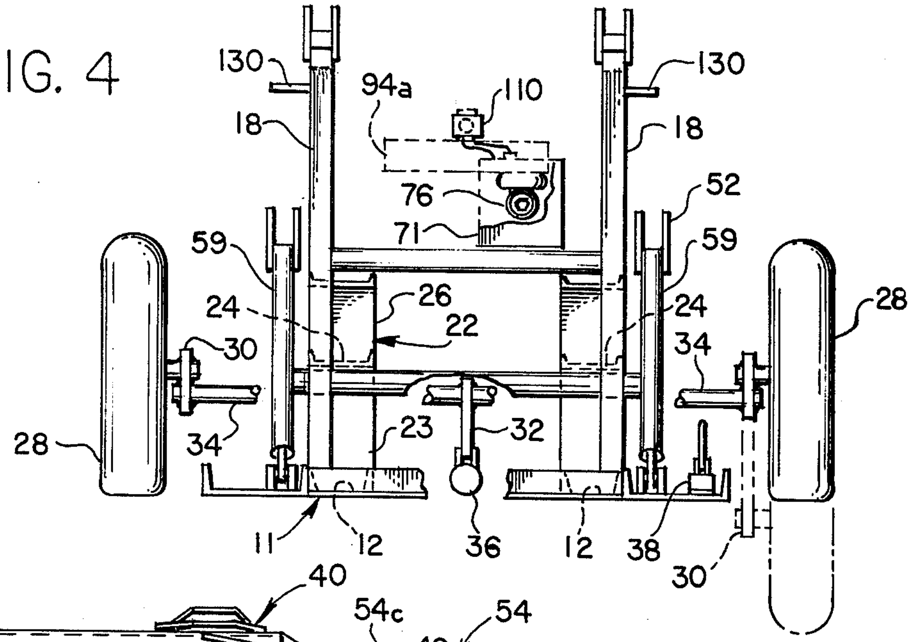
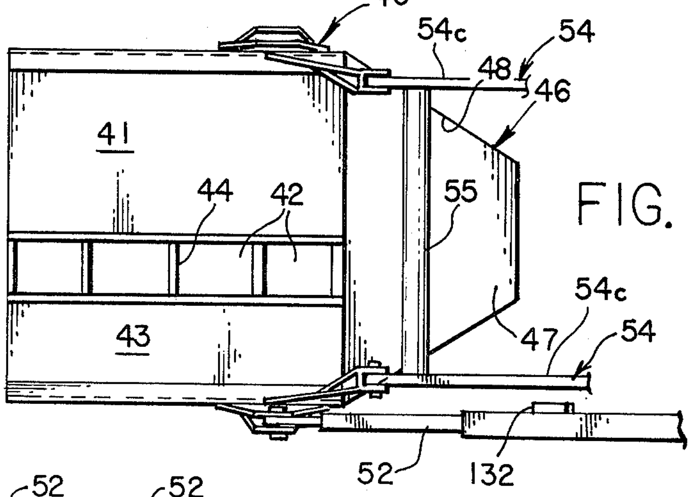
FIG. 5
FIG. 6
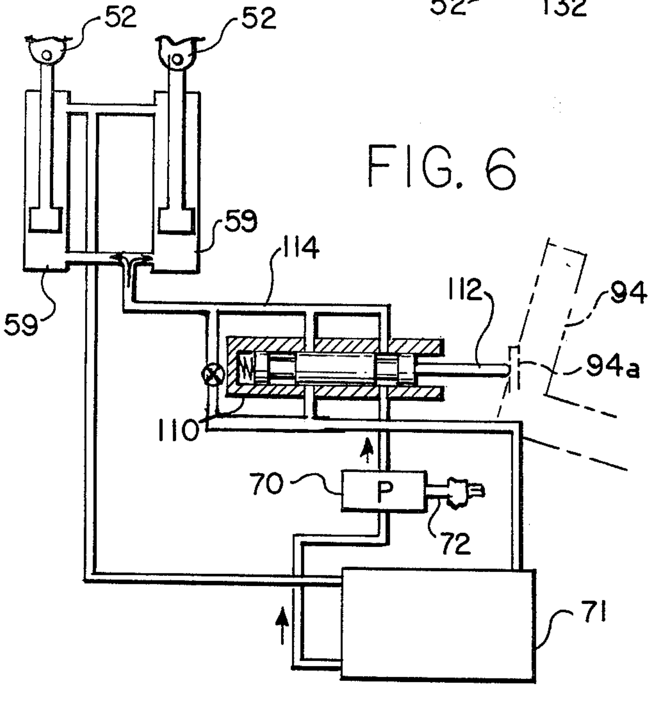
FIG. 6A
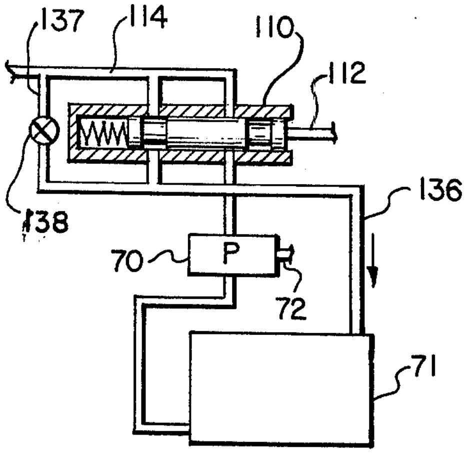

TRANSPORTER AND LOADING BOX FOR CONCRETE MIXER

BACKGROUND OF THE INVENTION

1. Field of the Invention

This invention pertains to portable mixing apparatus and, more particularly, to apparatus for transporting and loading such portable mixers.

2. Description of the Prior Art

Heretofore, portable concrete mixers have been loaded to the desired proportions of sand, water, gravel, cement and the like by hand or by very crude and expensive mechanized loaders. One such loader, for example, involves loading the batch box at one location and then through the use of a winch carrying it up to an overhead loading location where it is dumped into the mixer. Other mechanized loaders have carried the batched ingredients up a conveyor belt and then dumped them into the mixer. Both of these loading devices are relatively inconvenient to use since they must be separately carried to the construction site and repositioned only using heavy equipment.

SUMMARY OF THE INVENTION

It is an object of this invention to provide a loading apparatus for a portable mixer which also serves as a transporter for the mixer.

It is another object of this invention to provide a loading apparatus which derives its power from the portable mixer which it carries.

It is another object of this invention to provide a mobile transporter for a portable concrete mixer which can be moved with the mixer to the job site.

Basically, these objects are obtained by providing a transporter which can be trailed to the construction site. The transporter has provision for carrying the portable mixer and for positioning the mixer accurately with respect to a batch box on the transporter. The batch box is powered from a lowered position where it can be filled to an upper position where it dumps into the portable mixer. The batch box also has a storage position for traveling. While the transporter can have its own self-contained power supply, in the preferred embodiment the power is derived from a power takeoff on the portable mixer which is automatically engaged with the drive of the transporter when the mixer is positioned into its loading position on the transporter.

As is readily apparent, the transporter serves the very useful function of carrying the portable mixer to and from the job site thus freeing other construction equipment normally required for moving the mixer and batch box. Secondly, the mixer and transporter are designed to functionally operate relative to one another so that the mixer will always be in the proper position for loading from the batch box. Of course, in the preferred embodiment, the use of the power takeoff from the portable mixer to drive the batch box positioning apparatus of the transporter reduces the cost of powering the batch box.

BRIEF DESCRIPTION OF THE FIGURES OF THE DRAWING

FIG. 3A shows the batch box in a load or down position, FIG. 3B shows the batch box in a dump or up position, FIG. 3C shows the batch box in a down but intermediate position where it is being made ready for stowage, FIG. 3D shows the batch box in the stowage position.

FIG. 4 is an end elevation of the transporter shown in FIG. 1.

FIG. 5 is a fragmentary plan of the batch box shown in FIG. 1.

FIGS. 6 and 6A are a hydraulic schematic in two different conditions employed in the transporter of FIG. 1.

DETAILED DESCRIPTION OF THE PREFERRED EMBODIMENTS

Figures 1, 2, 3A, 3B, 3C, 3D:
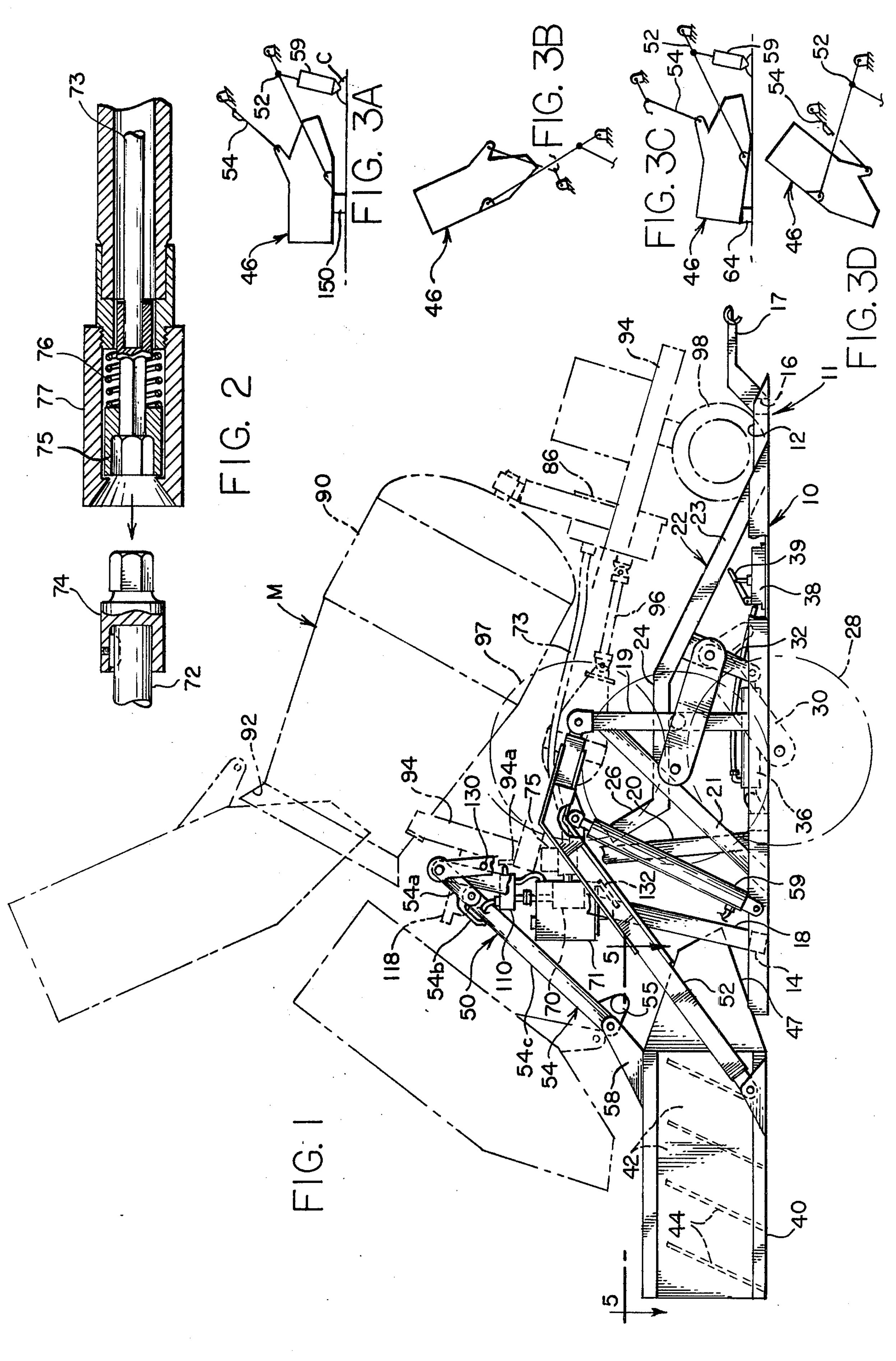
FIG. 1 is a side elevation of a transporter and portable mixer embodying the principles of the invention.
FIG. 2 is a fragmentary detail of a portion of the transporter and mixer of FIG. 1.
FIGS. 3A–3D are schematic operational views.

As best shown in FIG. 1, the transporter 10 is provided with a main frame 11 which includes a pair of horizontal, longitudinal channels 12 and forward and rearward transverse cross channels 14 and 16. The forward cross channel 16 is connected to a conventional trailer hitch 17. The frame 11 also includes pairs of rearward upstanding members 18 and forward upstanding members 19 having angle braces 20 and 21, respectively.

Secured to the longitudinal channels 12 and upstanding members 18 and 19 are a pair of transversely spaced ramps 22 each having an inclined forward portion 23 and intermediate horizontal portion 24 and an inclined rearward portion 26. The ramps are formed of upright channels and form a continuation rearwardly of the longitudinal channels 12. When the longitudinal channels, as will be described, are flat on the ground surface, the wheels of a portable mixer can be driven up along the longitudinal channels 12, up the inclined portion 23 and come to rest on the central portion 24 of the ramps with the wheels engaging the rearwardly inclined portions 26 of the ramps.

In order to lower the channels 12 onto the ground, the transporter is provided with wheels 28 which are carried on arms 30. Each arm 30 is fixed to an axle 34 which in turn is fixed to a bellcrank 32. The axle 34 is pivotally mounted to the underside of the ramps 22. Movement of the bellcrank 32 is controlled from a cylinder and piston 36 that is manually pressurized from a pump 38 having a manual pumping lever 39. As is readily apparent, extension of the piston rod of the cylinder 36 will move the wheels into the downward phantom line position as illustrated in FIG. 1 whereas retraction of the piston rod will lower the frame 11 about the wheels until the frame sits on the ground. With the frame on the ground, the open ends of the channels 12 will allow the wheels of the mixer to move smoothly up onto the ramps.

The transporter is also uniquely provided with a batch box 40 having a plurality of sections 41, 42 and 43 for holding aggregate, water and sand, respectively. Of course, where these ingredients are not always being used, any one of the sections or all of the sections can be used with the same ingredient or any combination thereof as desired. Preferably, the water section is provided with vertical baffles 44 to reduce sloshing of the water and to provide for separate measuring units within the water section. The forward end of the box is provided with a chute 46 which has an upwardly inclined bottom end 47 and forwardly inclined sidewalls 48. As is best shown in FIG. 1, the box is loaded with the desired ingredients when it is in its lowered or down position resting on the ground. Next, the box is raised to the upper position where the chute is lowered down into the open end of the mixer. To accomplish this the transporter is provided with a linkage mechanism 50 which will now be described.

The linkage mechanism 50 includes a pair of lower links 52 which are each pivoted at one end on the upstanding frame members 19 and pivoted at their opposite ends to the lower sides of the batch box. The linkage mechanism also includes a pair of upper links 54 which are pivoted at their upper ends to the pair of braces 20 and at their lower ends to a pair of ears 58 which are secured to the top of the sidewalls of the batch box. The upper links 54 are connected by a rigid torsion member 55 to give sidewise stability to the box. A pair of hydraulic cylinders 59 are pivotally connected to the frame 11 and their piston rods are pivotally connected to the lower links 52. Thus, extension of the piston rods of the cylinders 59 will cause the lower links 52 to pivot clockwise (FIG. 1) about the upper end of the upstanding members 19. This clockwise motion is best shown in FIG. 3B in which the batch box is raised and simultaneously rotated into the tilted dumping position where the contents of the batch box flow into the mixer. Retraction of the piston in the cylinder 59 will, of course, move links 52 and 54 counterclockwise lowering the batch box into a loading or down position as in FIG. 3. The remaining position is the travel position. The travel position is obtained by lowering the batch box into its down position but with the rearward end supported (FIG. 3C) on a block or stone 64 or the like so that the rearward end of the box is raised as the links are lowered. A secondary link is attached at the upper end of 54 to facilitate the over-center action. In this position, the lower pivot points of the links 54 move over-center past the line between the lower pivots for the links 52 and the upper pivots for the upper links 54. Now, when the piston rods of the hydraulic cylinders 59 are again extended and the links 52 are swung clockwise, the upper links 54 will first continue to move counterclockwise for a short distance extending the over-center condition and then will follow the lower links, also in a clockwise direction, causing the batch box to pivot into the upside down position shown in FIG. 3D. In this position, the batch box can be rinsed and will drain out while it is conveniently stored out of the way of the mixer.

To facilitate over-center movement of the links the links 54 are formed of an upper member 54*a* having a stop extension 54*b*. The upper member is pivoted to the brace 20 of the transporter frame and to a lower member 54*c*. As is best shown in FIGS. 3B and 3C, the links 54*a* and 54*c* form a toggle linkage which allows more flexibility between the pivot points of links 54. Thus the box is more easily inserted into the position shown in FIG. 3D and when moved into the dump position of FIG. 3B moves further into the inlet of the mixer and in so doing also snaps into the open toggle condition as shown which helps to shake the contents free in the box for more complete discharge.

Power to provide hydraulic pressure for the cylinders 59 is preferably provided with a pump 70 and a reservoir 71. The pump has a shaft 72 and preferably is powered by a flexible power shaft 73. Rotation of the shaft 73 is from a power takeoff on the gear box 86 of the mixer. The pump shaft 72 is provided with a hex cap 74 that is slidably received in a hex socket 75 coupled to the flexible shaft 73. A spring 76 in a housing 77 provides shock absorption for the cap 74. The housing 72 is secured to the mixer M and is aligned with the pump shaft 72 when the wheels 99 of the mixer are against the ramp portions 26. Thus the pump becomes powered automatically when the mixer is in position on the transporter.

The mixer M is shown in detail in assignee's copending United States Patent Application Ser. No. 646,252, filed Jan. 2, 1976, now abandoned, the description of which is hereby incorporated herein by reference thereto. For the purpose of this description, however, the mixer M includes a mixing drum 90 having an inlet 92. The drum is rotatably supported on a main frame 94. The mixer is provided with a conventional chute 118 for distributing concrete from the mixer in a conventional manner. Gear box 86 powers not only the power takeoff shaft 73 but also powers a shaft 96 that drives the mixer front wheels 97. The mixer has steerable rear wheels 98.

The operation of the loader will best be understood from the hydraulic schematic shown in FIGS. 6 and 6A. The pump 70 moves fluid to a spring biased valve 110 whose valve cone stem 112 when in a depressed position as shown in FIG. 6 directs the fluid through lines 114 to the two cylinders 59 extending their piston rods and thus moving the links 52 in a clockwise direction. The stem is moved into the depressed position automatically by being engaged by a bar 94*a* that is attached to the front end of the mixer frame 94 when the mixer is in the forward position (to the left in FIG. 1) on the transporter. When the valve is in the position shown in FIG. 6, the cylinders 59 are actuated thereby raising the then filled batch box to its upper dump position where the contents of the batch box are dropped into the mixer. The upward movement of the lower links 52 is limited by pins 130 which engage an elongated plate 132 on each lower link 52.

The power take off is coupled to the mixer transmission tub drive, so that, when the mixer tub is driven in the mix direction by moving a control lever on the mixer to the "mix" position the pump is driven and raises the batch box. The rotational direction or mix direction of the tub 90 assists in carrying the dumped material to the rear of the mixer tub to clear the inlet of the mixer for the remainder of the material from the box.

When the mixer is driven off the transporter, the valve spring extends the valve core stem 112 to the outer position shown in FIG. 6A and the weight of the batch box lowers the piston rods pushing fluid through line 114 and through the valve into line 136 back of the sump 71. The valve can also be bypassed by a line 137 which is controlled by a manually operated valve 138.

In the stowage position, the batch box is lowered in the same way but with the rear end blocked up as earlier described. When the mixer is returned to the transporter, the power takeoff immediately powers the pump 70 and the valve core stem 112 is again moved to the retracted position raising the batch box into the inverted travel position. The mixer motor is then turned off and since the mixer is then carried on the transporter in this position, the valve core stem 112 remains locked in the position shown in FIG. 6 thus assuring that the piston rods of the cylinders 59 will be locked in their upper extended position to assure that the batch box remains in its stored position.

As best shown in FIG. 3A a conventional hydraulic or mechanical weighing device 150 can support the box on the ground G where weight measurements rather than volume are desired in the batch box. Still another weighing technique is to shut off the hydraulic circuit prior to the cylinders bottoming out and measure the pressure in the hydraulic cylinders and convert this measurement to a corresponding weight measurement as each ingredient gets added to the box.

While the preferred embodiments of the invention have been illustrated and described, it should be understood that variations will be apparent to one skilled in the art without departing from the principles described herein. Accordingly, the invention is not to be limited to the specific embodiment shown in the drawings.

The embodiments of the invention in which a particular property or privilege is claimed are defined as follows:

1. Transportable apparatus for a portable concrete mixer, comprising:

a mobile frame, wheel means supporting the frame and having at least two wheels movable between a supporting position extending below the frame and a retracted position in which the frame rests on the ground, means for moving the wheel means between the two positions, track means on the frame for guiding the wheels of a self-powered portable mixer onto the frame into a load position, said mixer having an inlet, batch box means secured to said mobile frame and having a batch box movable between fill and dump positions, said box when in said dump position overlying said mixer inlet, said box when in said fill position being adjacent to the ground, linkage means for guiding the batch box into said positions, and actuator means for moving the batch box into said positions whereby the mixer can be filled by dumping the batch box contents into the mixer inlet while the mixer is on said mobile frame.

2. The apparatus of claim 1, said actuator means including a pair of hydraulic cylinders having extendible piston rods coupled to said linkage means, a pump, means for driving the pump, valve means having a valve core movable into a first position for raising said batch box and into a second position for lowering the batch box, and power takeoff means on said mixer engagable with said pump during those periods when the mixer is in said fill position for powering said pump.

3. The apparatus of claim 2, said valve means including valve operating means for moving said valve core when engaged by said mixer in the load position whereby the valve core is cycled to raise and dump the batch box when the mixer is moved into said load position.

4. The apparatus of claim 1, said batch box being movable to a storage position, said linkage means including a set of upper links pivoted at a first location on the mobile frame and a second location on the batch box, a set of lower links pivoted at a third location on the mobile frame and a fourth location on the batch box, said batch box being movable to position the second location over-center relative to a line between the first location and the fourth location so that the batch box is inverted into said storage position when raised.

5. The apparatus of claim 3, said batch box movable to a storage position, said linkage means including a set of upper links pivoted at a first location on the mobile frame and a second location on the batch box, a set of lower links pivoted as a third location on the mobile frame and a fourth location on the batch box, said batch box being movable to position the second location over-center relative to a line between the first location and the fourth location so that the batch box is inverted into said storage position when raised.

6. A mixer loading mechanism comprising a frame, means on said frame for guiding a portable mixer onto the frame into a load position, said mixer having an inlet, a loading box coupled to said frame and movable between an elevated dump position above the mixer inlet and a fill position close to the ground, means for moving the box between said fill position and said raised dump position, the box having an outlet positioned over the mixer inlet when in said dump position whereby the mixer can be loaded by dumping the contents of the box into said inlet, said mixer being self-propelled and having wheels and a power takeoff, said means for moving the box including a pump, hydraulic actuators and a valve movable into box raising and box lowering positions, means for coupling said pump to said power takeoff when the mixer is driven into said load position, and means for moving the valve into the raise box position when the mixer is in said load position.

7. The apparatus of claim 4, said upper links each including an upper member freely pivotally mounted to a lower member and a stop member for halting free pivotal movement of the members relative to one another in one direction of travel whereby the upper links have a flexible toggle action.

8. The apparatus of claim 4, said upper links including a rigid bar interconnecting each upper link to provide sidewise stabilization to the links.

* * * * *